United States Patent
Lim et al.

(10) Patent No.: US 11,985,336 B2
(45) Date of Patent: *May 14, 2024

(54) METHOD AND APPARATUS FOR VIDEO DECODING OF AREA OF INTEREST IN A BITSTREAM

(71) Applicant: SK TELECOM CO., LTD., Seoul (KR)

(72) Inventors: Jeong-yeon Lim, Seoul (KR); Sun-young Lee, Seoul (KR); Se-hoon Son, Seoul (KR); Jae-seob Shin, Seoul (KR); Hyeong-duck Kim, Suwon-si (KR); Gyeong-taek Lee, Seoul (KR); Jung-han Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/964,568

(22) Filed: Oct. 12, 2022

(65) Prior Publication Data

US 2023/0047755 A1 Feb. 16, 2023

Related U.S. Application Data

(63) Continuation of application No. 16/547,013, filed on Aug. 21, 2019, now Pat. No. 11,509,913, which is a
(Continued)

(30) Foreign Application Priority Data

Feb. 22, 2017 (KR) .......................... 10-2017-0023802
Mar. 21, 2017 (KR) .......................... 10-2017-0035579

(51) Int. Cl.
*H04N 19/167* (2014.01)
*H04N 19/119* (2014.01)
(Continued)

(52) U.S. Cl.
CPC ......... *H04N 19/167* (2014.11); *H04N 19/119* (2014.11); *H04N 19/174* (2014.11);
(Continued)

(58) Field of Classification Search
CPC .. H04N 19/167; H04N 19/119; H04N 19/463; H04N 19/597; H04N 19/70; H04N 19/174

See application file for complete search history.

(56) References Cited

U.S. PATENT DOCUMENTS 9,225,946 B2 12/2015 Lim et al.
9,554,133 B2 * 1/2017 Ye ........................... H04N 19/17
(Continued)

FOREIGN PATENT DOCUMENTS

JP 2013-132048 A 7/2013
JP 2014-197795 A 10/2014
(Continued)

OTHER PUBLICATIONS

International Search Report dated May 29, 2018 in connection with counterpart International Patent Application No. PCT/KR2018/002219.

*Primary Examiner* — Richard T Torrente
(74) *Attorney, Agent, or Firm* — Hauptman Ham, LLP

(57) ABSTRACT

A video decoding method for decoding an input bitstream in which each of pictures has been encoded with being split into a plurality of tiles, the method includes decoding partial decoding information included in the input bitstream and determining one or more target tiles to be decoded among the plurality of tiles according to the partial decoding information; and decoding video data corresponding to the one or more target tiles, wherein the partial decoding information includes at least one of first information indicating whether to perform partial decoding and second information
(Continued)

indicating an area on which partial decoding is to be performed.

5 Claims, 15 Drawing Sheets

Related U.S. Application Data continuation of application No. PCT/KR2018/002219, filed on Feb. 22, 2018.

(51) Int. Cl.
*H04N 19/174* (2014.01)
*H04N 19/463* (2014.01)
*H04N 19/597* (2014.01)
*H04N 19/70* (2014.01)

(52) U.S. Cl.
CPC ......... *H04N 19/463* (2014.11); *H04N 19/597* (2014.11); *H04N 19/70* (2014.11)

(56) References Cited

U.S. PATENT DOCUMENTS

| | | | |
|---|---|---|---|
| 9,749,627 | B2 | 8/2017 | Wu et al. |
| 10,057,570 | B2 | 8/2018 | Ye et al. |
| 2016/0165309 | A1* | 6/2016 | Van Brandenburg ........................ H04N 21/64322 725/116 |
| 2016/0165321 | A1 | 6/2016 | Denoual et al. |
| 2017/0034532 | A1 | 2/2017 | Yamamoto et al. |
| 2017/0118540 | A1 | 4/2017 | Thomas et al. |
| 2017/0318288 | A1 | 11/2017 | Wu et al. |
| 2017/0339415 | A1* | 11/2017 | Wang .................. H04N 19/167 |
| 2018/0124462 | A1 | 5/2018 | Lim et al. |
| 2019/0200029 | A1* | 6/2019 | Bangma ................ H04N 19/46 |

FOREIGN PATENT DOCUMENTS

| | | |
|---|---|---|
| KR | 10-2014-0057238 A | 5/2014 |
| KR | 10-2015-0058428 A | 5/2015 |
| KR | 10-2015-0140360 A | 12/2015 |
| WO | 2013027407 A1 | 2/2013 |
| WO | 2014168650 A1 | 10/2014 |

* cited by examiner

METHOD AND APPARATUS FOR VIDEO DECODING OF AREA OF INTEREST IN A BITSTREAM

RELATED APPLICATION

This present application is a continuation of U.S. patent application Ser. No. 16/547,013, filed on Aug. 21, 2019, which is a continuation of International Application No. PCT/KR2018/002219, filed Feb. 22, 2018, which is based upon and claims the benefit of priority from Korean Patent Application No. 10-2017-0023802 filed on Feb. 22, 2017 and Korean Patent Application No. 10-2017-0035579 filed on Mar. 21, 2017. The disclosures of the above listed applications are hereby incorporated by reference herein in their entireties.

TECHNICAL FIELD

The present disclosure relates to video decoding for efficiently decoding video.

BACKGROUND

The statements in this section merely provide background information related to the present disclosure and may not constitute prior art.

Since video data consumes a larger amount of data than voice data or still image data, storing or transmitting video data without compression thereof requires a lot of hardware resources including memory. Accordingly, in storing or transmitting video data, the video data is compressed using an encoder so as to be stored or transmitted. Then, a decoder receives the compressed video data, and decompresses and reproduces the video data. Compression techniques for such video include H.264/AVC and High Efficiency Video Coding (HEVC), which was established in early 2013 and improved coding efficiency over H.264/AVC by about 40%.

Recently, video size, resolution, and frame rate are gradually increasing, and there is increasing demand for video content such as games or 360-degree video (hereinafter referred to as "360° video") in addition to existing 2D natural images generated by cameras. As a result, the amount of data to be decoded increases, resulting in increase in complexity of the decoder.

In particular, in the case of 360° video, the image displayed on the screen must change according to change in the user's viewpoint. Therefore, for the next generation video codec, there is a demand for a technique capable of efficiently extracting data about a viewpoint of a requested region from a compressed bitstream without lowering coding efficiency.

SUMMARY

Technical Problem

Therefore, the present disclosure has been made in view of the above problems, and it is an object of the present invention to provide a video decoding method and apparatus capable of performing partial decoding by determining a partial decoding target area in real time by generating information for partial decoding at a receiving end.

Technical Solution

In accordance with one aspect of the present invention, provided is a method of decoding, by a video decoding apparatus, an input bitstream in which each of pictures has been encoded with being split into a plurality of tiles, the method including decoding partial decoding information included in the input bitstream and determining one or more target tiles to be decoded among the plurality of tiles according to the partial decoding information; and decoding video data of the input bitstream corresponding to the one or more target tiles, wherein the partial decoding information includes at least one of first information indicating whether to perform partial decoding and second information indicating an area within the picture on which partial decoding is to be performed.

In accordance with another aspect of the present invention, provided is a video decoding system for decoding an input bitstream in which each of pictures has been encoded with being split into a plurality of tiles, the video decoding system including a partial decoding information generator configured to generate the input bitstream by resetting partial decoding information set to a null value or a default value in a predetermined field of a bitstream received from a video encoding apparatus in accordance with an external control signal for determining execution of partial decoding; and a video decoding apparatus configured to determine one or more target tiles to be decoded among the plurality of tiles by decoding the partial decoding information included in the input bitstream and to decode video data of the input bitstream corresponding to the one or more target tiles, wherein the partial decoding information includes at least one of first information indicating whether to perform partial decoding and second information indicating an area on which partial decoding is to be performed.

DETAILED DESCRIPTION

Figure 1:
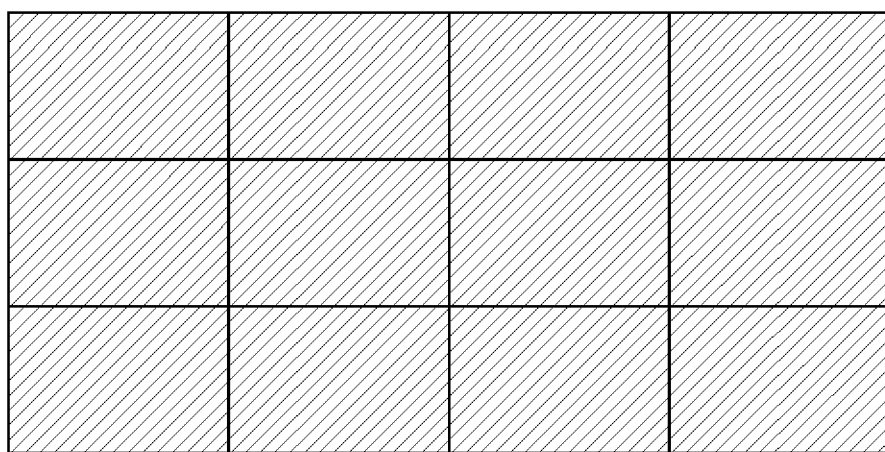
FIG. 1 is an exemplary view of a picture to be encoded with being split into a plurality of tiles.

Hereinafter, some embodiments of the present invention will be described in detail with reference to the accompanying drawings. It should be noted that, in adding reference numerals to the constituent elements in the respective drawings, like reference numerals designate like elements, although the elements are shown in different drawings. Further, in the following description of the present invention, a detailed description of known functions and configurations incorporated herein will be omitted when it may make the subject matter of the present invention rather unclear.

FIG. 1 is an exemplary view of a picture to be encoded with being split into a plurality of tiles.

A picture may be split into one or more tiles such that each tile may be independently encoded and decoded. The picture may be split into one or more columns of tiles, split into one or more rows of tiles, or split into one or more columns and one or more rows of tiles. The tiles may be evenly split based on the width or height of the picture, or may be split to have an area of any size. However, the rows should have the same number of tiles and the columns have the same number of tiles.

An example of a high level syntax for tiles is shown in Table 1.

TABLE 1

| | Descriptor |
|---|---|
| pic_parameter_set_rbsp( ) { | |
| ... | ... |
| tiles_enabled_flag | u(1) |
| ... | ... |
| if( tiles_enabled_flag ) { | |
|   num_tile_columns_minus1 | ue(v) |
|   num_tile_rows_minus1 | ue(v) |
|   uniform_spacing_flag | u(1) |
|   if( !uniform_spacing_flag) { | |
|     for( i = 0; i < num_tile_columns_minus1;i++ ) | |
|       column_width_minus1[ i ] | ue(v) |
|     for( i = 0; i < num_tile_rows_minus1;i++ ) | |
|       row_height_minus1[ i ] | ue(v) |
|   } | |
|   loop_filter_across_tiles_enabled_flag | u(1) |
| } | |

Table 1 shows tiles_enabled_flag, which is a flag indicating an on/off state of a tile function in the picture parameter set (PPS), and multiple syntaxes for specifying the size of tiles when the flag is set in an "on" state. The table also shows num_tile_columns_minus1, which has a value obtained by subtracting 1 from the number of tiles split based on the horizontal axis of the picture, num_tile_rows_minus1, which has a value obtained by subtracting 1 from the number of tiles split based on the vertical axis of the picture, and uniform_spacing_flag, which is a flag indicating that the tiles are evenly split on the horizontal and vertical axes. When the tiles are not evenly split on the horizontal and vertical axes (uniform_spacing_flag=off), the width information (column_width_minus1) about each tile based on the horizontal axis and the height information (row_height_minus1) about each tile based on the vertical axis are additionally transmitted. Lastly, a flag (loop_filter_across_tiles_enabled_flag) indicating whether a loop filter is to be executed in a boundary region between tiles is transmitted. The present disclosure is directed to a video decoding method and apparatus capable of greatly reducing decoding complexity by decoding only a part of the entire area of a picture which has been encoded with being split into a plurality of tiles (hereinafter referred to as "partial decoding"), rather than decoding the whole picture.

In order to enable partial decoding, one picture should be split into a plurality of tiles and each of the split tiles should be allowed to be independently encoded and decoded. Here, independence means that all encoding/decoding processes including intra prediction, inter prediction, conversion, quantization, entropy, and filtering are performed independently of those for the other split tiles. Hereinafter, the independently encoded tiles are referred to as "independent tiles."

It is assumed that the video decoding method and apparatus of the present disclosure are applied to a picture which has been encoded with being split into a plurality of independent tiles. Here, the tile merely refers to a tool for independently encoding and decoding each one of a plurality of areas into which one picture is split, and embodiments of the present disclosure are not necessarily limited to the term tile. That is, the term tile may be replaced by various terms that have the same meaning as mentioned above. Hereinafter, the present disclosure will be described in detail with reference to a picture split into twelve independent tiles as shown in FIG. 1.

Figure 2:
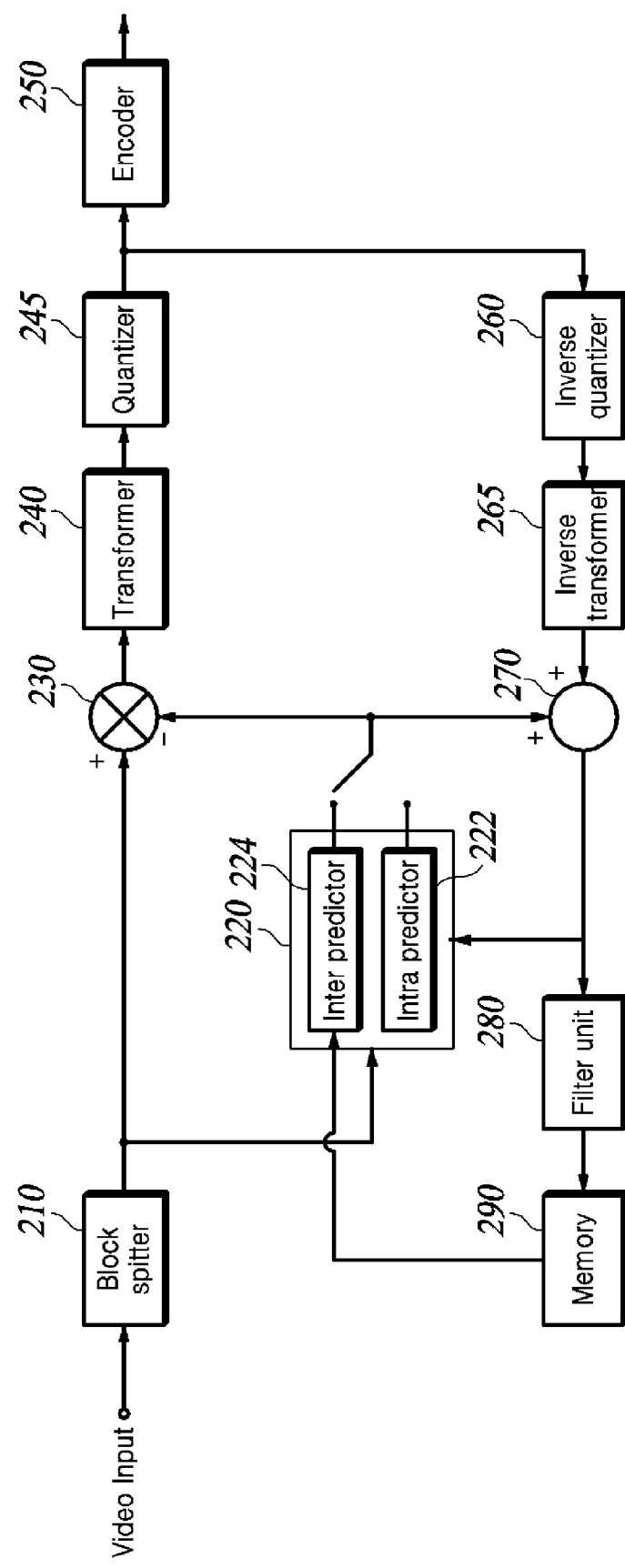
FIG. 2 is a block diagram of a video encoding apparatus according to an embodiment of the present disclosure.

FIG. 2 is a block diagram of a video encoding apparatus related to an embodiment of the present disclosure.

The video encoding apparatus includes a block splitter 210, a predictor 220, a subtractor 230, a transformer 240, a quantizer 245, an encoder 250, an inverse quantizer 260, an inverse transformer 265, an adder 270, a filter unit 280, and a memory 290. Each element of the video encoding apparatus may be implemented as a hardware chip, or may be implemented as software, and the microprocessor may be implemented to execute the functions of the software corresponding to the respective elements.

The block splitter 210 splits each picture constituting video into a plurality of tiles. Then, the block splitter 210 splits each of the tiles into a plurality of coding tree units (CTUs), and then recursively splits the CTUs using a tree structure. In the tree structure, a leaf node is a coding unit (CU), which is a basic unit of encoding. A QuadTree (QT) structure, in which a node is split into four sub-nodes, or a QuadTree plus BinaryTree (QTBT) structure including the QT structure and a BinaryTree (BT) structure, in which a node is split into two sub-nodes, may be used as the tree structure.

The predictor 220 generates a prediction block by predicting a current block. The predictor 220 includes an intra predictor 222 and an inter predictor 224. Here, the current block, which is a basic unit of encoding corresponding to a leaf node in the tree structure, refers to a CU to be encoded at present. Alternatively, the current block may be one of a plurality of sub-blocks into which the CU is split.

The intra predictor 222 predicts pixels in the current block using pixels (reference samples) located around the current block in a current picture including the current block. There are plural intra prediction modes according to the prediction directions, and the neighboring pixels to be used and the calculation equation are defined differently according to each prediction mode.

The inter predictor 224 searches for a block most similar to the current block in a reference picture encoded and decoded earlier than the current picture, and generates a prediction block for the current block using the searched block.

Then, the inter predictor generates a motion vector corresponding to a displacement between the current block in the current picture and the prediction block in the reference picture. Motion information including information about the reference picture used to predict the current block and information about the motion vector is encoded by the encoder 250 and transmitted to the decoding apparatus.

The subtractor 230 subtracts the prediction block generated by the intra predictor 222 or the inter predictor 224 from the current block to generate a residual block.

The transformer 240 transforms residual signals in the residual block having pixel values in the spatial domain into transform coefficients in the frequency domain. The transformer 240 may transform the residual signals in the residual block by using the size of the current block as a transform unit, or may split the residual block into a plurality of smaller subblocks and transform residual signals in transform units corresponding to the sizes of the subblocks. There may be various methods of splitting the residual block into smaller subblocks. For example, the residual block may be split into subblocks of the same predefined size, or may be split in a manner of a quadtree (QT) which takes the residual block as a root node.

The quantizer 245 quantizes the transform coefficients output from the transformer 240 and outputs the quantized transform coefficients to the encoder 250.

The encoder 250 encodes the quantized transform coefficients using a coding scheme such as CABAC to generate a bitstream. The encoder 250 encodes information about the size of a CTU positioned in the uppermost layer of the tree structure and the splitting information for splitting a block from the CTU into a tree structure such that the video decoding apparatus can split the block in the same manner as the encoding apparatus. For example, in the case of QT splitting, QT splitting information indicating whether the block of an upper layer is split into four blocks of the lower layer is encoded. In the case of BT splitting, BT splitting information having an indication of whether each block is split into two blocks and indicating the split type is encoded, starting with a block corresponding to a leaf node of QT.

The encoder 250 encodes information about a prediction type indicating whether the current block is encoded by intra prediction or inter prediction, and encodes intra prediction information or inter prediction information according to the prediction type.

The encoding unit 250 encodes a predetermined field for a syntax element related to the partial decoding information. Here, the predetermined field refers to a data region used for syntax elements related to the partial decoding information. However, the encoder 250 sets a null value or a default value in the predetermined field instead of the information instructing actual partial decoding to secure a space for the syntax element related to the partial decoding information in the bitstream. Here, the default value may be information indicating that partial decoding will not be performed (e.g., flag indicating execution of partial decoding=off). The syntax element related to the partial decoding information may be configured at a predetermined position in the Network Abstraction Layer (NAL) unit header of the bitstream. Alternatively, the syntax element may be configured at a predetermined position in any one header among Sequence Parameter Set (SPS), Picture Parameter Set (PPS) and Supplemental Enhancement Information (SEI).

When partial decoding is externally determined to be performed after the bitstream generated by the encoder 250 is transmitted to the video decoding system, the null value or the default value set in the predetermined field of the bitstream will be reset to a meaningful value indicating partial decoding by a partial decoding information generator, which will be described later.

The inverse quantizer 260 inversely quantizes the quantized transform coefficients output from the quantizer 245 to generate transform coefficients. The inverse transformer 265 transforms the transform coefficients output from the inverse quantizer 260 from the frequency domain to the spatial domain to reconstruct the residual block.

The adder 270 adds the reconstructed residual block to the prediction block generated by the predictor 220 to reconstruct the current block. The pixels in the reconstructed current block are used as reference samples in performing intra prediction of the next block in order.

The filter unit 280 deblock-filters the boundaries between the reconstructed blocks in order to remove blocking artifacts caused by block-by-block encoding/decoding and stores the blocks in the memory 290. When all the blocks in one picture are reconstructed, the reconstructed picture is used as a reference picture for inter prediction of a block in a subsequent picture to be encoded.

Figure 3:
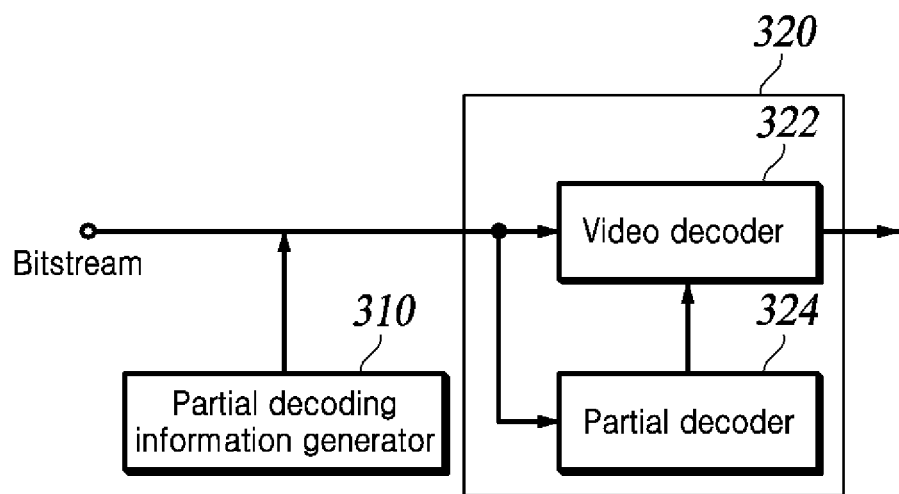
FIG. 3 is a block diagram of a video decoding system according to an embodiment of the present disclosure.

FIG. 3 is a block diagram of a video decoding system according to an embodiment of the present disclosure. The video decoding system may include a partial decoding information generator 310 and a video decoding apparatus 320. The video decoding apparatus 320 may include a video decoder 322 and a partial decoder 324. Each component of the video decoding system may be implemented as a hardware chip or may be implemented as software such that a microprocessor implements functions of the software corresponding to the respective components.

The partial decoding information generator 310 generates an input bitstream by resetting the partial decoding information set to a null value or a default value in a predetermined field of the bitstream received from the video encoding apparatus according to an external control signal for determining execution of partial decoding. The external control signal for determining partial decoding may be a signal generated according to external input from a user, an area-of-interest extraction technique, or a value predetermined by a service scenario. The input bitstream generated by the partial decoding information generator 310 is a bitstream input to the video decoding apparatus 320 and is distinguished from the bitstream received from the video encoding apparatus by the partial decoding information generator 310. That is, the input bitstream is a bitstream generated by resetting partial decoding information set to the null value or default value in the predetermined field of the bitstream received from the encoding apparatus.

The partial decoding information includes at least one of first information indicating whether to perform partial decoding and second information for indicating an area upon which partial decoding is to be performed. However, the value of the partial decoding information may vary depending on whether partial decoding determined by the video decoding system is performed after the video encoding. When the partial decoding is determined to be performed, the partial decoding information has a value reset by the partial decoding information generator 310, not the null or default value set in the predetermined field of the bitstream received from the encoding apparatus. The value reset by the partial decoding information generator 310 is a meaningful value for instructing execution of the partial decoding. On the other hand, when partial decoding is not determined to be performed, the partial decoding information has a value set to null or default in the predetermined field of the bitstream received from the encoding apparatus. This is because the partial decoding information is not reset by the partial decoding information generator 310.

As execution of partial decoding is determined, the video decoding system resets, in the predetermined field of the above-mentioned bitstream, meaningful information including at least one of partial decoding information, i.e., information (first information) indicating execution of partial decoding, and information (second information) indicating an area on which partial decoding is to be performed. More specifically, the partial decoding information generator 310 may transmit a partial decoding execution command to the video decoding apparatus 320 by resetting the partial decoding information in the corresponding field.

For example, when a flag is used to indicate whether partial decoding is to be performed, the video encoding apparatus may encode the flag so as to indicate an off or null value and encode information for indicating a tile to be subjected to partial decoding with null, "0", or data indicating "do not care." When partial decoding is determined to be performed after the bitstream of the encoded video is received by the video decoding system, the partial decoding information generator 310 may change the flag indicating whether partial decoding is performed to "on" and reset meaningful information in a predetermined field for indicating an area to be subjected to partial decoding.

The video decoding apparatus 320 decodes the partial decoding information from the input bitstream in which the partial decoding information is reset by the partial decoding information generator 310 and decodes the video data corresponding to the partial area indicated by the partial decoding information. Specifically, the partial decoder 324 decodes the partial decoding information included in the input bitstream to determine one or more target tiles to be decoded. The video decoder 322 decodes video data corresponding to the one or more target tiles among a plurality of tiles constituting a picture.

Figure 4:
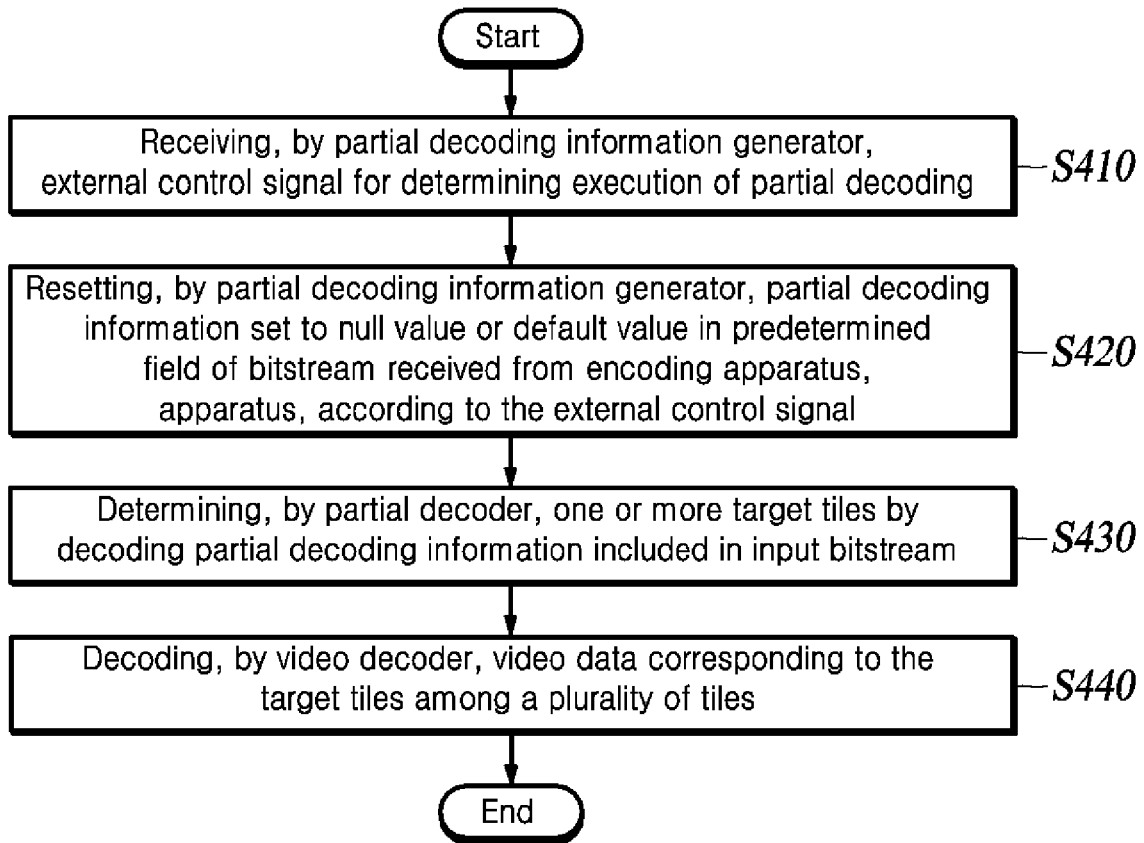
FIG. 4 is a flowchart illustrating operation of a video decoding system according to an embodiment of the present disclosure.

FIG. 4 is a flowchart illustrating operation of a video decoding system according to an embodiment of the present disclosure.

First, the partial decoding information generator 310 receives an external control signal for determining execution of partial decoding (S410). The partial decoding information generator 310 resets the partial decoding information set to a null value or a default value in the predetermined field of the bitstream received from the encoding apparatus, according to the external control signal (S420). The partial decoding information generator 310 generates an input bitstream by resetting the partial decoding information. The input bitstream is transmitted to the video decoding apparatus 320. The partial decoder 324 of the video decoding apparatus 320 determines one or more target tiles to be decoded by decoding the partial decoding information included in the input bitstream (S430). The determined information about the one or more target tiles is transmitted to the video decoder 322, and the video decoder 322 decodes the video data corresponding to the one or more target tiles among the plurality of tiles (S440).

Figure 5:
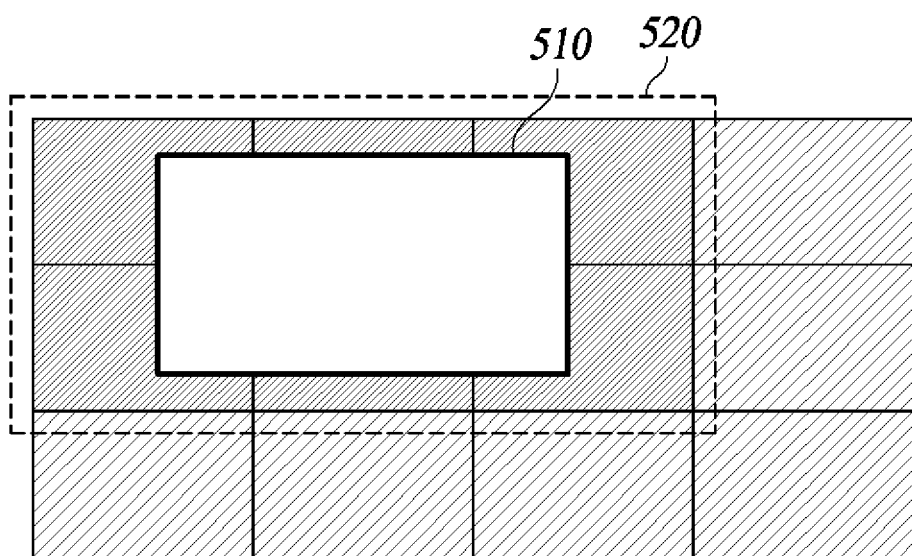
FIG. 5 is an exemplary diagram showing a display area and target tiles to be decoded in an encoded picture.

An example will be described with reference to FIG. 5. FIG. 5 is an exemplary diagram showing a display area and target tiles to be decoded in an encoded picture.

When only a part of the whole picture which has been encoded with being split into a plurality of tiles is to be displayed, decoding only the area to be displayed rather than decoding the whole picture may significantly reduce decoding complexity. For example, in a case where a display area 510 is determined in a picture split into 12 tiles as shown in FIG. 5, the display area 510 may be displayed by decoding only 6 tiles (hereinafter referred to as "target tiles") containing the display area 510 rather than decoding all 12 tiles.

Partial decoding information is necessary for the video decoding apparatus 320 to determine one or more target tiles among a plurality of tiles in a picture to perform partial decoding. The partial decoding information includes at least one of first information indicating whether partial decoding is to be performed and second information indicating an area to be subjected to partial decoding, as described above.

The partial decoding information may be included in the header of the input bitstream. The header of the input bitstream may be one of a Network Abstraction Layer (NAL) unit header, a sequence parameter set (SPS), a picture parameter set (PPS), and supplemental enhancement information (SEI).

The first information indicating whether to perform partial decoding in the partial decoding information may be included in one header among the NAL unit header, the SPS, the PPS, and the SEI, and the second information indicating an area to be subjected to partial decoding may be one of the SEI and an internal parameter of the decoding apparatus. Here, the parameter means a parameter for controlling the decoding operation.

The first information may be represented in the following three forms:

i) NAL unit type information (nal_unit_type) included in the NAL unit header;

ii) a separate flag (pd_enabled_flag);

iii) determining whether to perform partial decoding based on the second information without separate signaling.

Here, when the first information is not separately signaled, the video encoding apparatus does not provide a separate space (field) for a syntax element related to the first information.

The second information may include different kinds of information according to embodiments as follows:

a) Position information and size information about the display area;

b) identification information about the first tile and the last tile constituting the one or more target tiles.

The method of determining the one or more target tiles may depend on the information contained in the second information and the method of representing the first information. Details will be described later.

Hereinafter, a description will be given of a method of determining target tiles and an example of the NAL unit header according to each of the three types of representation of the first information. For the sake of clarity, however, the second information will be limited to case a) where the second information includes the position information and size information about the display area. Case b) where the second information includes the identification information about the first tile and the last tile constituting the one or more target tiles will be separately described later.

First, the case where the first information is represented by i) NAL unit type information (nal_unit_type) included in the NAL unit header will be described. An example of the NAL unit header according to this embodiment is shown in Table 2.

TABLE 2

|  | Descriptor |
|---|---|
| nal_unit_header( ) { | |
|   forbidden_zero_bit | f(1) |
|   nal_unit_type | u(6) |
|   ... | ... |
|   u_pos | |
|   v_pos | |
|   u_width | |
|   v_height | |
|   ... | |
| } | |

Referring to Table 2, the position (u, v) information about the display area is represented by u_pos and v_pos, and the size information about the display area (the width and height of the display area) may be represented by u_width and v_height. The second information may be included in the header of the bitstream at all times without any condition (i.e., regardless of whether the NAL unit type information is VCL or non-VCL) as shown in Table 2, or may be included only when a specific condition is satisfied. For example, the second information may be included in the header of the bitstream when the NAL unit type information corresponds to VCL (Video Coding Layer) or when the NAL unit type information corresponds to an I (Intra) slice.

The NAL unit type including slice data that needs to be subjected to partial decoding corresponds to VCL, and the NAL unit type including header information such as SPS, PPS, and SEI, which do not require partial decoding, corresponds to non-VCL. Therefore, partial decoding information may be included only in the NAL unit type corresponding to the VCL requiring partial decoding. Alternatively, the partial decoding information may be included only in a NAL unit type corresponding to the I slice among the VCL NAL unit types including the slice data. That is, the partial decoding information can be set and changed in the I slice due to the video encoding (reference for prediction) structure.

An example of the NAL unit header for a case where there is a condition for including the second information in the header of the bitstream is shown in Tables 3 and 4. Table 3 is configured on the condition that the NAL unit type information corresponds to the VCL, and Table 4 is configured on the condition that the NAL unit type information corresponds to the I slice.

TABLE 3

|  | Descriptor |
|---|---|
| nal_unit_header( ) { | |
|   forbidden_zero_bit | f(1) |
|   nal_unit_type | u(6) |
|   ... | ... |
|   if (nal_unit_type == VCL) { | |
|     u_pos | |
|     v_pos | |
|     u_width | |
|     v_height | |
|   } | |
| } | |

TABLE 4

|  | Descriptor |
|---|---|
| nal_unit_header( ) { | |
|   forbidden_zero_bit | f(1) |
|   nal_unit_type | u(6) |
|   ... | ... |
|   if (nal_unit_type == I slice) { | |
|     u_pos | |
|     v_pos | |
|     u_width | |
|     v_height | |
|   } | |
| } | |

The HEVC standard has six kinds of NAL unit type information representing I slices. In this embodiment, NAL unit type information about a total of 12 I slices including information indicating whether partial decoding (PD) is performed may be defined in addition to the information about the six NAL unit types defined in the HEVC standard. The defined NAL unit type information is shown in Table 5.

TABLE 5

| nal_unit_type | Name of nal_unit_type | Content of NAL unit and RBSP syntax structure | NAL unit type class |
|---|---|---|---|
| ... | | | |
| | BLA_W_LP<br>BLA_W_RADL<br>BLA_N_LP<br>BLA_W_LP_PD<br>BLA_W_RADL_PD<br>BLA_N_LP_PD | Coded slice segment of a BLA picture slice_segment_layer_rbsp( ) | VCL |
| | IDR_W_RADL<br>IDR_N_LP<br>IDR_W_RADL_PD<br>IDR_N_LP_PD | Coded slice segment of an IDR picture slice_segment_layer_rbsp( ) | VCL |
| | CRA_NUT<br>CRA_NUT_PD | Coded slice segment of a CRA picture slice_segment_layer_rbsp( ) | VCL |

For example, the NAL unit type information corresponding to one of BLA_W_LP, BLA_W_RADL, BLA_N_LP, IDR_W_RADL, IDR_N_LP, and CRA_NUT at the time of coding may be changed to one of BLA_W_LP_PD, BLA_W_RADL_PD, BLA_N_LP_PD, IDR_W_RADL_PD, IDR_N_LP_PD, and CRA_NUT_PD by the partial decoding information generator 310 after partial decoding is determined. While the present disclosure defines a NAL unit type indicating whether PD is performed based on the HEVC standard for simplicity, the present disclosure is not limited thereto. That is, a specific NAL unit type indicating whether PD is performed may be defined among the NAL unit types, and Table 5 is merely an example.

Figure 6:
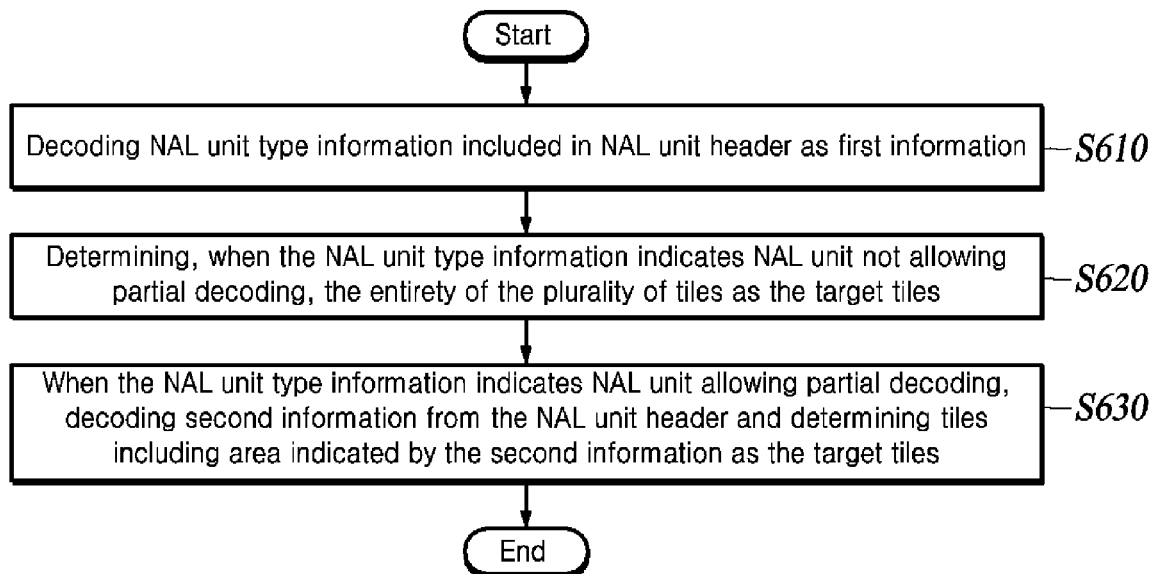
FIG. 6 is a flowchart illustrating a method of determining one or more target tiles to be decoded according to an embodiment of the present disclosure.

A method of determining, by the partial decoder 324, target tiles according to the embodiment will be described with reference to FIG. 6. FIG. 6 is a flowchart illustrating a method of determining one or more target tiles according to an embodiment of the present disclosure.

The partial decoder 324 first decodes the NAL unit type information included in the NAL unit header as first information (S610). When the NAL unit type information indicates a NAL unit that does not allow partial decoding (e.g., the NAL unit type information is BLA_W_LP), the entirety of a plurality of tiles is determined as the one or more target tiles (S620). For example, when the NAL unit type information indicates that partial decoding is not allowed, the second information is not reset to a meaningful value by the partial decoding information generator 310. The second information is maintained as a value such as null set by the encoding apparatus. Accordingly, the partial decoder 324 confirms that the second information is null, and determines the entirety of the plurality of tiles constituting a picture as the one or more target tiles. On the other hand, when the NAL unit type information indicates a NAL unit allowing partial decoding (e.g., the NAL unit type information is BLA_W_LP_PD), the second information included in the NAL unit header also has a value reset to meaningful information in relation to partial decoding. Accordingly, the second information is decoded and the tiles including an area indicated by the second information are determined as the one or more target tiles (S630).

Hereinafter, as another embodiment, the case where the first information is represented by ii) a separate flag (pd_enabled_flag) will be described. Table 6 shows an example of the NAL unit header according to this embodiment.

TABLE 6

|  | Descriptor |
| --- | --- |
| nal_unit_header( ) { |  |
|   forbidden_zero_bit | f(1) |
|   nal_unit_type | u(6) |
|   ... | ... |
|   pd_enbled_flag |  |
|   u_pos |  |
|   v_pos |  |
|   u_width |  |
|   v_height |  |
|   ... |  |
| } |  |

In this embodiment, the first information (i.e., pd_enabled_flag) and the second information may always be included in the header of the bitstream without any condition (i.e., regardless of whether the NAL unit type information is VCL or non-VCL) as shown in Table 6, or may be included only when a certain condition is met. The first information and the second information may be included in the header of the bitstream when the NAL unit type information corresponds to the VCL, or when the NAL unit type information corresponds to the I slice. Table 7 shows an example of the NAL unit header when the NAL unit type information corresponds to the VCL, and Table 8 shows an example of the NAL unit header when the NAL unit type information corresponds to the I slice.

TABLE 7

|  | Descriptor |
| --- | --- |
| nal_unit_header( ) { |  |
|   forbidden_zero_bit | f(1) |
|   nal_unit_type | u(6) |
|   ... | ... |
|   if (nal_unit_type == VCL) { |  |
|     pd_enbled_flag |  |
|     u_pos |  |
|     v_pos |  |
|     u_width |  |
|     v_height |  |
|   } |  |
| } |  |

TABLE 8

|  | Descriptor |
| --- | --- |
| nal_unit_header( ) { |  |
|   forbidden_zero_bit | f(1) |
|   nal_unit_type | u(6) |
|   ... | ... |
|   if (nal_unit_type == I slice) { |  |
|     pd_enbled_flag |  |
|     u_pos |  |
|     v_pos |  |
|     u_width |  |
|     v_height |  |
|   } |  |
| } |  |

Figure 7:
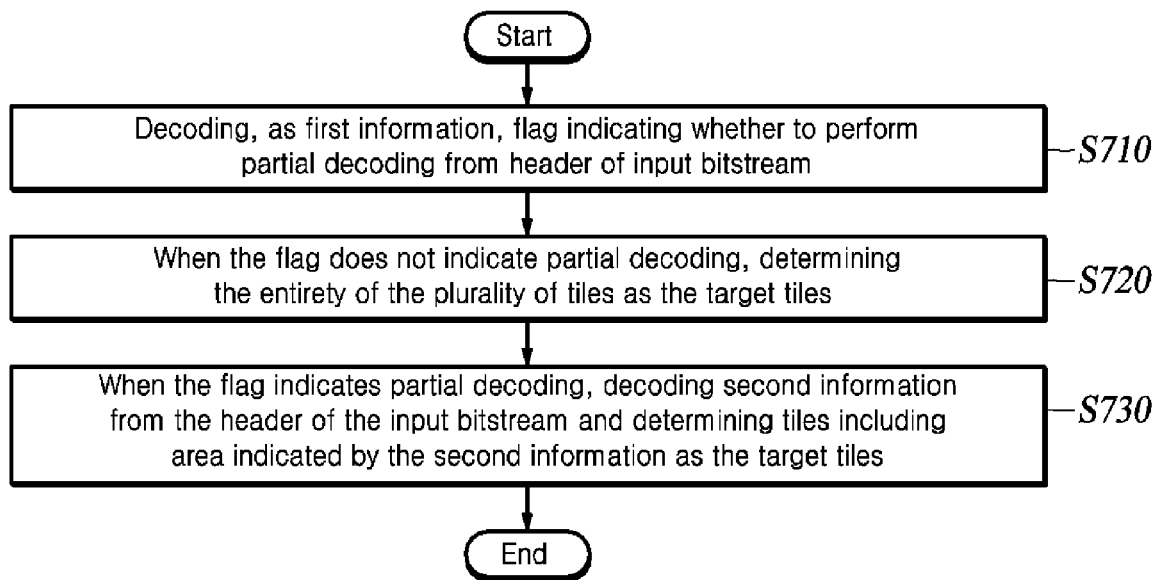
FIG. 7 is a flowchart illustrating a method of determining one or more target tiles to be decoded according to another embodiment of the present disclosure.

In this embodiment, there are six kinds of NAL unit type information indicating I slices, which are the same as the case of the HEVC standard. A description will be given of a method of determining, by the partial decoder 324, one or more target tiles to be decoded according to the present embodiment with reference to FIG. 7. FIG. 7 is a flowchart illustrating a method of determining one or more target tiles to be decoded according to another embodiment of the present disclosure.

The partial decoder 324 first decodes a flag indicating whether to perform partial decoding from the header of the input bitstream as first information (S710). When the flag does not indicate partial decoding (e.g., pd_enabled_flag is off), the entirety of the plurality of tiles is determined as the one or more target tiles (S720). When the flag indicates partial decoding (e.g., pd_enabled_flag is on), the second information included in the header of the input bitstream includes meaningful information in relation to the partial decoding, and accordingly the second information is decoded and the tiles including the area indicated by the second information are determined as the one or more target tiles (S730).

Lastly, as another embodiment, a case where whether to perform partial decoding is determined using the second information without separately signaling the first information will be described. An example of the NAL unit header according to this embodiment is shown in Table 2.

In this embodiment, the first information is not separately signaled, but whether partial decoding is performed may be inferred from the second information. For example, the video encoding apparatus may allocate the value of 0 (or a null value) to all syntaxes (u_pos, v_pos, u_width, v_height) for the second information, and then all the values of the syntaxes decoded in the video decoding apparatus 320 may be maintained at 0 (or the null value) as execution of partial decoding is not determined. In this case, the video decoding apparatus 320 may infer that partial decoding is not performed. On the contrary, when the video encoding apparatus allocates the value of 0 (or a null value) to all syntaxes (u_pos, v_pos, u_width, v_height) for the second information, and then execution of partial decoding is determined, the partial decoding information generator 310 may change the values of the syntaxes for the second information encoded with 0 (or the null value) to instruct execution of partial decoding.

Similarly, in this embodiment, the second information may always be included in the header of the bitstream without any condition (i.e., regardless of whether the NAL unit type information is VCL or non-VCL) as shown in Table 2, or may be included only when a specific condition is satisfied. An example of the NAL unit header for the case where the NAL unit type information corresponds to the VCL is shown in Table 3, and an example of the NAL unit header for the case where the NAL unit type information corresponds to the I slice is shown in Table 4.

In this embodiment, there are six types of NAL unit type information indicating I slices as in the HEVC standard.

Figure 8:
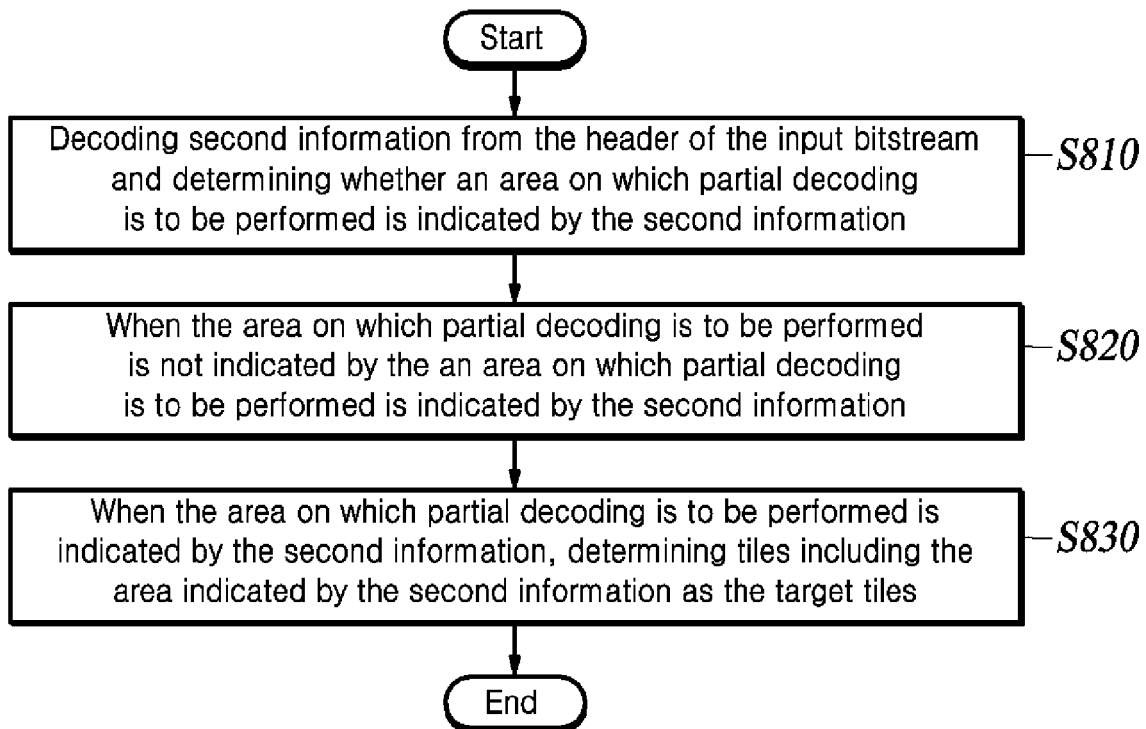
FIG. 8 is a flowchart illustrating a method of determining one or more target tiles to be decoded according to another embodiment of the present disclosure.

Hereinafter, a method of determining, by the partial decoder 324, one or more target tiles to be decoded according to the embodiment will be described with reference to FIG. 8. FIG. 8 is a flowchart illustrating a method of determining one or more target tile to be decoded according to another embodiment of the present disclosure.

The partial decoder 324 first decodes the second information from the header of the input bitstream, and determines whether an area on which partial decoding is to be performed is indicated by the second information (S810). When an area on which partial decoding is to be performed is not indicated by the second information, the entirety of a plurality of tiles is determined as the one or more target tiles (S820). Alternatively, when an area on which partial decoding is to be performed is indicated by the second information, the area indicated by the second information is determined as the one or more target tile (S830).

As described above, the second information may include position information and size information about the display area. Here, the position information includes the position of a reference point in the picture, which is a two-dimensional plane, or a three-dimensional space, and the size information includes the width and height with respect to the reference point. The display area may be defined as an area extending from the position of the reference point by the width and height according to the size information. In this case, one or more target tiles may be determined as tiles having an area overlapping with the display area defined by the position information and size information.

In the description above, the width (u_width) and the height (v_height) are used to indicate the size of the display area. However, the present disclosure is not limited thereto. Various syntaxes that can define the size of the display area may be used. For example, the positions of the reference point and the vertices on the diagonal line may be used as information indicating the size of the display area. When the reference point is the upper left vertex of the display area, the information indicating the size of the display area may be represented by the position of the lower right vertex.

Hereinafter, a detailed description will be given of case b) where the second information includes identification information about the first tile and the last tile constituting one or more target tiles. Using the identification information about the first tile (top left tile) and the last tile (bottom right tile) constituting the one or more target tiles based on the position and size information about the area on which partial decoding is to be performed, the partial decoding information generator 310 may update the corresponding syntax in the header of the bitstream. Accordingly, the video decoding apparatus 320 may decode the identification information about the first tile and the identification information about the last tile included in the header of the input bitstream and determine the target tiles based on the decoded information.

Figure 9:
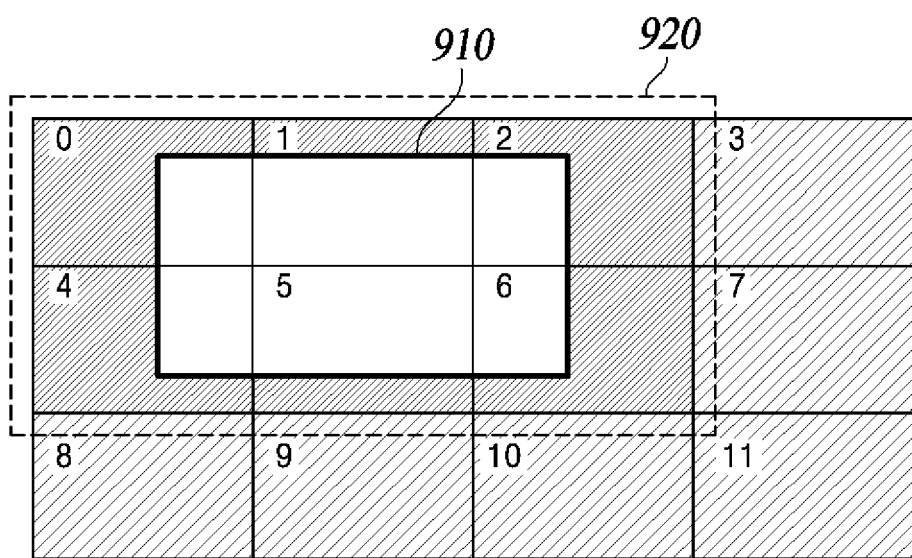
FIG. 9 is another exemplary diagram of a display area and target tiles to be decoded in an encoded picture.

An example will be described with reference to FIG. 9. FIG. 9 is another exemplary diagram of a display area and target tiles in an encoded picture.

FIG. 9 shows a picture split into a plurality of tiles having identification information of 0 to 11 and encoded. The target tiles 920 determined according to the display area 910 is composed of tiles 0, 1, 2, 4, 5 and 6. In this case, a partial decoding information generator 310 updates the corresponding syntax in the bitstream header using the identification information (0) about the first tile and the identification information (6) about the last tile and transmits the updated syntax to the video decoding apparatus 320. Accordingly, the video decoding apparatus 320 determines the tile area in which the first tile and the last tile are composed of the top left tile and the bottom right tile, respectively, as the target tiles 920 and decodes tiles 0, 1, 2, 4, 5 and 6.

Even when the pieces of identification information about independent tiles are discontinuous, the video decoding apparatus 320 according to the embodiment may perform partial decoding with reference to spatial configuration.

Even in this embodiment, the first information indicating whether to perform partial decoding may be represented in the following three forms:

i) NAL unit type information (nal_unit_type) included in the NAL unit header;

ii) a separate flag (pd_enabled_flag);

iii) determining whether to perform partial decoding based on the second information without separate signaling.

In this embodiment, in case iii), when tiles on which partial decoding is to be performed are indicated by the identification information about the first tile and the identification information about the last tile, the indicated tiles may be determined as tiles to be decoded. For example, when either the first tile index or the last tile index matches any one of the tile indexes of a plurality of tiles into which a picture is split, it may be determined that partial decoding is performed. On the other hand, if neither the first tile index nor the last tile index matches any of the tile indexes of the plurality of tiles into which the picture is split (e.g., all have null values), it may be determined that partial decoding is not performed.

Table 9 shows an example of the NAL unit header according to this embodiment.

TABLE 9

| | Descriptor |
|---|---|
| nal_unit_header( ) { | |
|   forbidden_zero_bit | f(1) |
|   nal_unit_type | u(6) |
|   ... | ... |
|   topleft_tile_id | |
|   bottomright_tile_id | |
|   ... | |
| } | |

Referring to Table 9, the identification information about the first tile may be indicated by topleft_tile_id, and the identification information about the last tile may be indicated by bottomright_tile_id. Similarly, in this embodiment, the second information may be included in the header of the bitstream at all times without any condition (i.e., regardless of whether the NAL unit type information is VCL or non-VCL) as shown in Table 9, or may be included only when a specific condition is satisfied. An example of the NAL unit header for the case where the NAL unit type information corresponds to the VCL is shown in Table 10, and an example of the NAL unit header for the case where the NAL unit type information corresponds to the I slice is shown in Table 11.

TABLE 10

|  | Descriptor |
|---|---|
| nal_unit_header( ) {  |  |
|   forbidden_zero_bit | f(1) |
|   nal_unit_type | u(6) |
|   ... | ... |
|   if (nal_unit_type == VCL) { |  |
|     topleft_tile_id |  |
|     bottomrigh_tile_id |  |
|   } |  |
| } |  |

TABLE 11

|  | Descriptor |
|---|---|
| nal_unit_header( ) {  |  |
|   forbidden_zero_bit | f(1) |
|   nal_unit_type | u(6) |
|   ... | ... |
|   if (nal_unit_type == I slice) { |  |
|     topleft_tile_id |  |
|     bottomrigh_tile_id |  |
|   } |  |
| } |  |

Figure 10:
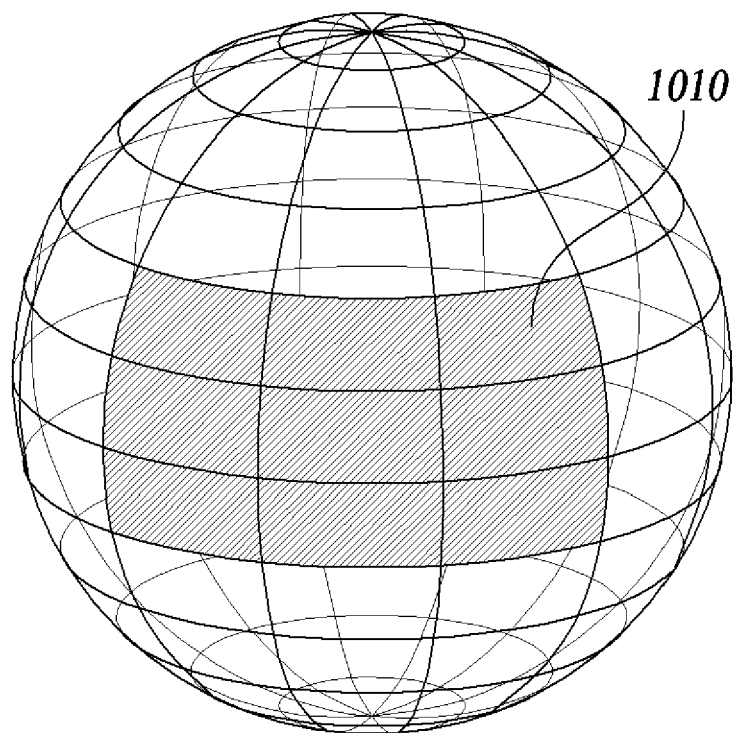
FIG. 10 is an exemplary diagram showing a display area of 360° video.
Figure 11A:
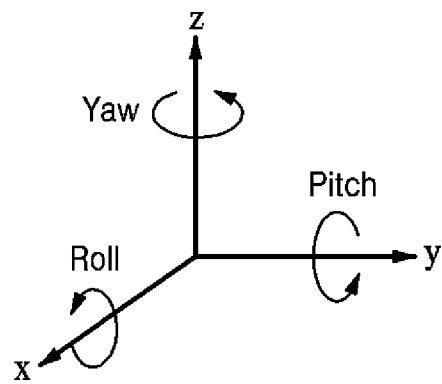
FIG. 11A and FIG. 11B show coordinate axes for representing the position of a display area in 360° video.
Figure 11B:
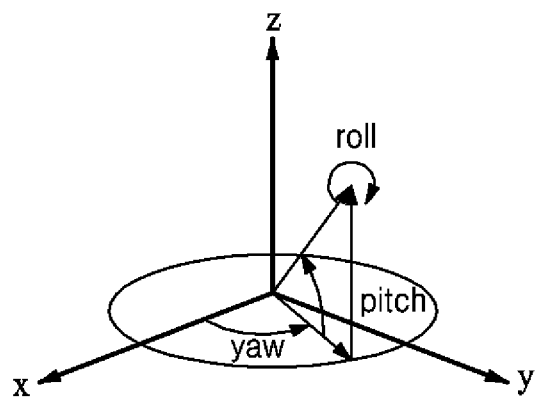

FIG. 10 is an exemplary diagram showing a display area of 360° video. FIG. 11A and FIG. 11B show coordinate axes for representing the position of a display area in 360° video. The display area 1010 of FIG. 10 may be represented by the degrees of rotation about the x-axis, y-axis, and z-axis taken as the rotation axes with respect to the origin of the three-dimensional space as shown in FIG. 11A and FIG. 11B. Pitch indicates the degree of rotation about the horizontal axis (y axis), yaw indicates the degree of rotation about the vertical axis (z axis), and roll indicates the degree of rotation about an axis perpendicular to the pitch-yaw plane at the center point of the sphere.

In order to perform partial decoding of 360° video, the video decoding apparatus 320 needs first information indicating whether to perform partial decoding and second information indicating an area on which partial decoding is to be performed. In the case of 360° video, the first information can be represented in three forms as in the above-described other embodiments, and thus a detailed description thereof will be omitted.

Table 12 shows an example of the NAL unit header according to this embodiment.

TABLE 12

|  | Descriptor |
|---|---|
| nal_unit_header( ) {  |  |
|   forbidden_zero_bit | f(1) |
|   nal_unit_type | u(6) |
|   ... | ... |
|   Yaw |  |

TABLE 12-continued

|  | Descriptor |
|---|---|
|   Roll |  |
|   Pitch |  |
|   delta_yaw |  |
|   delta_pitch |  |
|   ... |  |
| } |  |

Referring to Table 12, the first information indicating whether to perform partial decoding may be indicated by nal_unit_type, the position information about the display area may be indicated by yaw, roll, and pitch, and the size information about the display area may be indicated by delta_pitch (the dimension of the display area in the horizontal direction) and delta_yaw (the dimension of the display area in the vertical direction). The reference point in the 3D space may be specified by yaw and pitch, and the width and height from the reference point is specified by delta_pitch and delta_yaw. Then, the display area in the 3D space is determined by rotating the area defined by yaw, pitch, delta_pitch, and delta_yaw by the value indicated by roll about a line segment connecting the center point of the area and the origin of the sphere. The one or more target tiles may be defined as one or more tiles overlapping with the 2D projection of the display area defined in the 3D space.

Similarly, in this embodiment, the second information may always be included in the header of the bitstream without any condition (i.e., regardless of whether the NAL unit type information is VCL or non-VCL) as shown in Table 12, or may be included only when a specific condition is satisfied. An example of the NAL unit header for the case where the NAL unit type information corresponds to the VCL is shown in Table 13, and an example of the NAL unit header for the case where the NAL unit type information corresponds to the I slice is shown in Table 14.

TABLE 13

|  | Descriptor |
|---|---|
| nal_unit_header( ) {  |  |
|   forbidden_zero_bit | f(1) |
|   nal_unit_type | u(6) |
|   ... | ... |
|   if (nal_unit_type == VCL) { |  |
|     Yaw |  |
|     Roll |  |
|     Pitch |  |
|     delta_yaw |  |
|     delta_pitch |  |
|   } |  |
| } |  |

TABLE 14

|  | Descriptor |
|---|---|
| nal_unit_header( ) {  |  |
|   forbidden_zero_bit | f(1) |
|   nal_unit_type | u(6) |
|   ... | ... |
|   if (nal_unit_type == I slice) { |  |
|     Yaw |  |
|     Roll |  |
|     Pitch |  |

TABLE 14-continued

| Descriptor |
|---|
| delta_yaw |
| delta_pitch |
| } |
| } |

Figure 12:
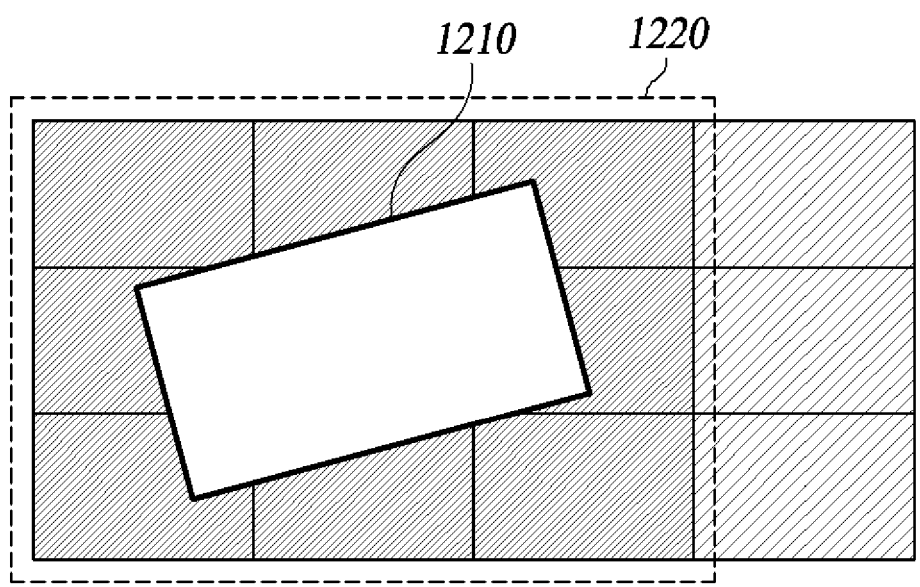
FIG. 12 is an exemplary diagram showing a display area and target tiles to be decoded in 360° video projected onto a two-dimensional plane.

In this embodiment, NAL unit type information about a total of 12 I slices including information indicating whether partial decoding (PD) is performed may be defined in addition to the information about the six NAL unit types defined in the HEVC standard. The defined NAL unit type information is shown in Table 5. While the present disclosure defines a NAL unit type indicating whether PD is performed based on the HEVC standard for simplicity, the present disclosure is not limited thereto. That is, a specific NAL unit type indicating whether PD is performed may be defined among the NAL unit types, and Table 5 is merely an example. FIG. 12 is an exemplary diagram showing a display area 1210 and target tiles 1220 in 360° video projected onto a two-dimensional plane. The video decoding apparatus 320 or the partial decoding information generator 310 may determine the pixel position of the display area 1210 projected onto the two-dimensional plane based on the position information and size information about the display area 1010 in the three-dimensional space.

The position information and size information about the display area of the 360° video may be represented by position information and size information in the three-dimensional space as shown in Tables 12 to 14, or may be represented by position information and size information in the two-dimensional plane. Details will be described with reference to FIG. 13.

Figure 13:
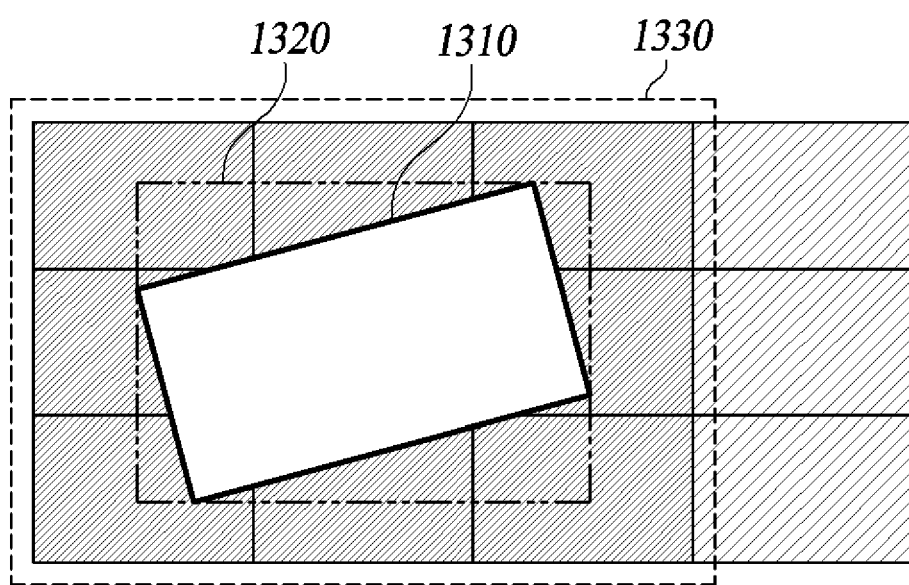
FIG. 13 is another exemplary diagram showing a display area and target tiles to be decoded in 360° video projected onto a two-dimensional plane.

FIG. 13 is another exemplary diagram showing a display area 1310 and target tiles 1330 in 360° video projected onto a two-dimensional plane.

The partial decoding information generator 310 may expand the display area 1310 to a rectangle 1320 indicated by the dotted line in FIG. 13 and use the position information and size information about the dotted rectangle 1320 as the second information for indicating a decoding target area (tile). In this case, the syntaxes u_pos, v_pos, u_width, and v_height disclosed in Tables 2 to 4 and Tables 6 to 8 are replaced with those for the dotted rectangle 1320.

For example, when partial decoding is determined to be performed, the partial decoding information generator 310 may replace the position information and size information about the display area 1310 and change corresponding syntax values in the bitstream header to the position information and size information about the dotted rectangle 1320 expanded from the display area 1310. Here, the position information indicates the position of the reference point of the dotted rectangle 1320, and the size information indicates the width and height with respect to the reference point. In this case, the partial decoder 324 may define the dotted rectangle 1320 as an area extending from the position of the reference point corresponding to the position information by the width and the height according to the size information, and determine tiles having an area overlapping with the dotted rectangle 1320 as the target tiles.

Alternatively, the partial decoding information generator 310 may replace the position information and size information about the display area 1310 and change corresponding syntax values in the bitstream header to information about the top left vertex and the bottom right vertex of the dotted rectangle 1320. In this case, the partial decoder 324 may define the area formed by extending from the top left vertex and the bottom right vertex as the dotted rectangle 1320 and determine tiles having an area overlapping with the dotted rectangle 1320 as the target tiles.

In another embodiment, the display area 1310 may be expanded to the dotted rectangle 1320 of FIG. 13, and set the identification information (topleft_tile_id) about the first tile and the identification information (topleft_tile_id) about the last tile (bottomright_tile_id) defined in Tables 9 to 11 using the dotted rectangle 1320. In this case, the partial decoding information generator 310 may change the corresponding syntax values in the bitstream to be the identification information about a tile including the top left vertex of the dotted rectangle 1320, which is the identification information about the first tile, and the identification information about a tile including the bottom right vertex of the dotted rectangle 1320, which is the identification information about the last tile. By setting the tile identified by the identification information about the first tile as the top left tile and the tile identified by the identification information about the last tile as the bottom right tile, the partial decoder 324 may determine the tiles as the target tiles.

In another embodiment, the display area 1310 may be represented by position information (pixel position information) about the four vertices of the display area 1310. In this case, the partial decoding information generator 310 may change the corresponding syntax values in the bitstream to the position information (pixel position information) about the four vertexes of the display area 1310, and the partial decoder 24 may define the display area 1310 using the position information about the four vertexes to determine a tile having an area overlapping with the display area 1310 as a target tile.

In another embodiment, the display area 1310 may be represented by the identification information about the top left tile, the top right tile, the bottom left tile, and the bottom right tile including the four vertices of the display area 1310. In this case, the partial decoding information generator 310 may change the corresponding syntax values in the bitstream to the identification information about the top left tile, the top right tile, the bottom left tile, and the bottom right tile including the four vertices of the display area 1310. The partial decoder 324 may define the display area 1310 using the identification information about the top left tile, the top right tile, the bottom left tile, and the bottom right tile and determine tiles having an area overlapping with the display area 1310 as the target tiles.

Figure 14:
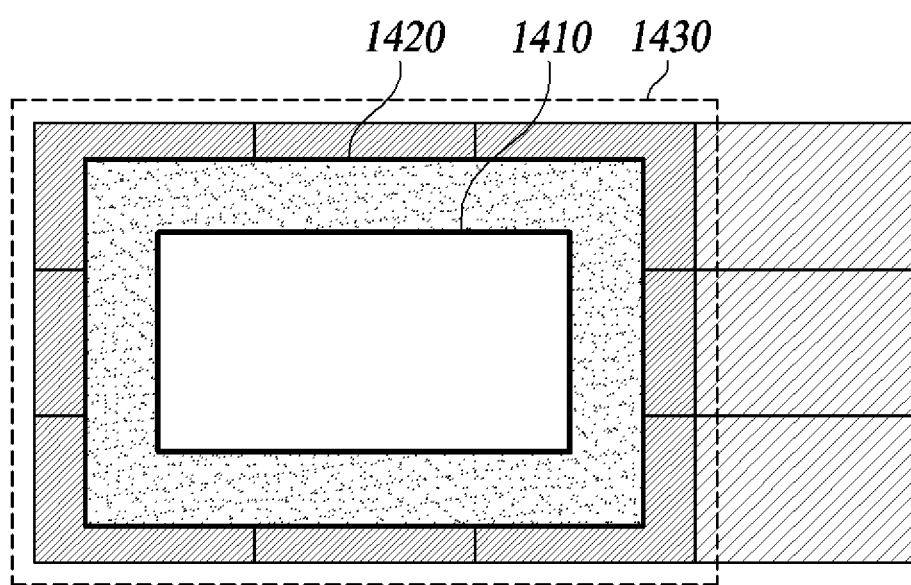
FIG. 14 is an exemplary diagram showing a display area, an additional area outside the display area, and target tiles in an encoded picture.

FIG. 14 is an exemplary diagram showing a display area 1410, an additional area 1420 outside the display area, and target tiles 1430 in an encoded picture.

In partial decoding, not only one or more target tiles on which partial decoding is to be performed, but also the remaining area (hereinafter referred to as an "additional area") needs to be decoded due to sudden change of the user's viewpoint. If the additional area 1420 is not present, only the target tiles needs to be decoded as described above. However, if the additional area 1420 is present, the tiles including both the display area 1410 and the additional area 1420 should be decoded.

Accordingly, the second information for indicating tiles on which partial decoding is to be performed may further include information for indicating the additional area 1420 other than the display area 1410. The information for indicating the additional area 1420 may be defined as a proportion (e.g., 1.5, 2.0) to the size of the display area or an absolute size (e.g., 100, 150). The information for indicating the additional region 1420 may be encoded at the position of one or more of the SPS, PPS, SEI, slice header, and NAL unit header. In this embodiment, the target tiles may be determined as one or more tiles including the display area 1410 and the additional area 1420.

Figure 15:
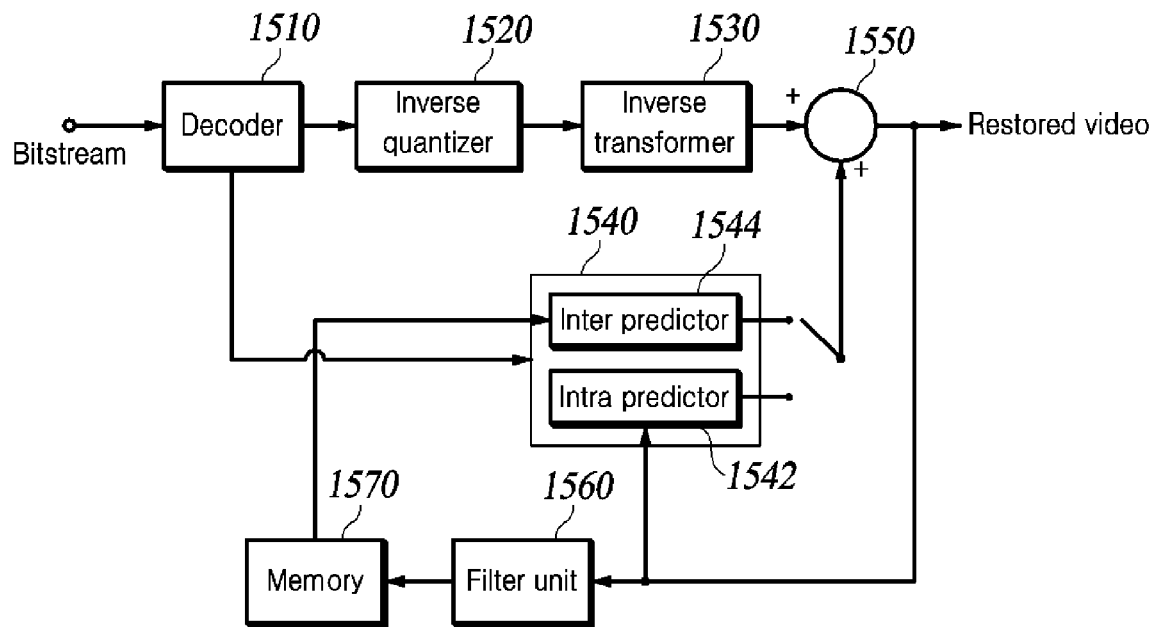
FIG. 15 is a block diagram of the detailed components of the video decoder of FIG. 3 according to an embodiment of the present disclosure.

Hereinafter, with reference to FIG. 15, a description will be given of a process in which the video decoder 322 of FIG. 3 decodes each determined target tile to recover an image. FIG. 15 is a block diagram of the detailed components of the video decoder 322 according to an embodiment of the present disclosure.

The video decoder 322 includes a decoder 1510, an inverse quantization unit 1520, an inverse transformer 1530, a predictor 1540, an adder 1550, a filter unit 1560, and a memory 1570. The components shown in FIG. 15 may be implemented as a hardware chip, or may be implemented as software and a microprocessor may be implemented to execute the functions of the software corresponding to the respective elements.

The decoder 1510 may be implemented as an integrated component capable of performing the function of the partial decoder 324 of FIG. 3. The decoder 1510 may decode the bitstream to extract information related to partial decoding such that only target tiles rather than the whole picture are decoded or only a reconstructed bitstream for partial decoding rather than the whole bitstream is decoded.

The decoder 1510 extracts prediction information and information about the residual signal, which are needed to restore the target tile or the reconstructed bitstream. The decoder 1510 extracts information about a coding tree unit (CTU) size from a high-level syntax such as SPS or PPS to determine the size of the CTU, and splits the target tile into CTUs of the determined size. Then, the decoder determines a CTU as the uppermost layer of the tree structure, that is, the root node, and extracts the splitting information about the CTU to split the CTU using the tree structure.

Upon determining a current block to be decoded through the splitting of the tree structure, the decoder 1510 extracts information about a prediction type indicating whether the current block is intra-predicted or inter-predicted. When the prediction type information indicates intra prediction, the decoder 1510 extracts a syntax element for the intra prediction information (intra prediction mode) of the current block. When the prediction type information indicates inter prediction, the decoder 1510 extracts a syntax element for the inter prediction information.

The decoder 1510 extracts information about quantized transform coefficients of the current block as information about the residual signals.

The inverse quantizer 1520 inversely quantizes the quantized transform coefficients. The inverse transformer 1530 inversely transforms the inversely quantized transform coefficients from the frequency domain to the spatial domain to reconstruct the residual signals, and thereby generates a residual block for the current block.

The predictor 1540 includes an intra predictor 1542 and an inter predictor 1544. The intra predictor 1542 is activated when the prediction type of the current block is intra prediction, and the inter predictor 1544 is activated when the prediction type of the current block is inter prediction.

The intra predictor 1542 determines an intra prediction mode of the current block among the plurality of intra prediction modes from the syntax element for the intra prediction mode extracted from the decoder 1510, and predicts the current block using reference pixels around the current block according to the intra prediction mode.

The inter predictor 1544 determines the motion information about the current block using the syntax element for the inter prediction information extracted by the decoder 1510, and predicts the current block using the determined motion information.

The adder 1550 adds the residual block output from the inverse transformer 1530 and the prediction block output from the inter predictor 1544 or intra predictor 1542 to reconstruct the current block. The pixels in the reconstructed current block are utilized as reference pixels for intra prediction of a block to be decoded later.

The filter unit 1560 deblock-filters the boundaries between the reconstructed blocks in order to remove blocking artifacts caused by block-by-block decoding and stores the deblock-filtered blocks in the memory 1570. When all the blocks in one picture are reconstructed, the reconstructed picture is used as a reference picture for inter prediction of blocks in a subsequent picture to be decoded.

As shown in FIG. 3, a description has been given above of a video decoding method by which the video decoding apparatus 320 decodes the partial decoding information included in the input bitstream to determine one or more target tiles to be decoded, and decodes video data corresponding to the one or more target tiles. Hereinafter, with reference to FIG. 16, a description will be given of a case where target tiles are determined at the stage preceding the video decoding apparatus, and the decoding apparatus decodes the determined one or more target tiles.

Figure 16:
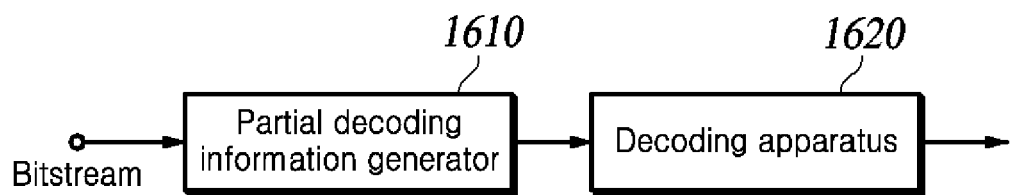
FIG. 16 is a block diagram of a video decoding system according to another embodiment of the present disclosure.

FIG. 16 is a block diagram of a video decoding system according to another embodiment of the present disclosure. The video decoding system may include a partial decoding information generator 1610 and a video decoding apparatus 1620. Each component of the video decoding system may be implemented as a hardware chip, or may be implemented as software, and a microprocessor may implement the function of software corresponding to each component.

The partial decoding information generator 1610 extracts and reconstructs, according to an external control signal for determining whether to perform partial decoding, a portion to be decoded in a bitstream received from the encoder, and transmits the decoded portion to the video decoding apparatus 1620. Hereinafter, the bitstream reconstructed by the partial decoding information generator 1610 will be referred to as an input bitstream. The external control signal for determining partial decoding may refer to a signal generated according to an input from an external user, a region-of-interest extraction technique, or a value predetermined by a service scenario.

The video decoding apparatus 1620 receives the input bitstream from the partial decoding information generator 1610 and decodes the input bitstream.

In this embodiment, only information indicating that the bitstream has been reconstructed for partial decoding needs to be transmitted to the video decoding apparatus 1620. The partial decoding information generator 1610 generates the input bitstream by setting information indicating the reconstruction of the bitstream in a predetermined field of the bitstream received from the encoding apparatus. The input bitstream is transmitted to the video decoding apparatus 1620. Here, the predetermined field refers to a data area used for syntax elements related to the partial decoding information, and is encoded into a meaningless value (null or default value) by the encoding apparatus. Thereafter, when execution of partial decoding is determined, the field is reset to a meaningful value by the partial decoding information generator 1610.

Table 15 shows an example of the NAL unit header according to this embodiment.

TABLE 15

|  | Descriptor |
|---|---|
| nal_unit_header( ) { | |
|   forbidden_zero_bit | f(1) |
|   nal_unit_type | u(6) |
|   ... | ... |
|   pd_enbled_flag | |
|   ... | |
| } | |

Referring to Table 15, pd_enabled_flag indicates whether the bitstream has been reconstructed for partial decoding. Table 15 shows a case where pd_enabled_flag is included in the header of the bitstream at all times without any condition (i.e., regardless of whether the NAL unit type information is VCL or non-VCL). However, pd_enabled_flag of this environment may be included only when a specific condition is satisfied as in other embodiments. That is, it may be included when the NAL unit type information corresponds to the VCL or when the NAL unit type information corresponds to an I slice. In this embodiment, there are six types of NAL unit type information indicating I slices.

In another embodiment, specific NAL unit type information for partial decoding that is not a separate flag (pd_enabled_flag) may be defined. In this case, even if the identification information about independent tiles is discontinuous, the video decoding apparatus 1620 may perform partial decoding, considering that partial decoding rather than transmission error has been triggered.

The process in which the video decoding apparatus 1620 of FIG. 16 decodes tile-related syntax elements (see Table 1) from the reconstructed bitstream, splits the picture into a plurality of tiles and decodes each of the tiles is similar to the operation described above with reference to FIG. 15, and thus a detailed description thereof will be omitted.

Although the partial decoding information generator described above is illustrated as being included in the video decoding system according to the present disclosure, embodiments are not limited thereto. The partial decoding information generator may be separately implemented.

When partial decoding is performed on video as in the above-described embodiments, decoding of the audio component may be performed as follows.

First, an audio component mapped to a position corresponding to the partial decoding area of the video or the like may be selected using information about the position, and the selected audio component may be decoded and output. In particular, 360° video, panoramic views, or other images with spatial features are being served along with audio in various formats such as 3D audio, multi-channel audio, and multi-track audio. For example, audio components in various formats can be provided according to the position, angle, and distance corresponding to a specific point in space.

Accordingly, when partial decoding is performed on each video, the partial decoding area may be predetermined by the partial decoding information generator, and the corresponding position information may be transmitted to the video and audio encoders. Partial decoding of the video is performed based on the transmitted position information, and audio decoding corresponding to the position, angle, and distance is performed. In this operation, the partial decoding information generator may directly transmit the position information to the audio encoder, or may select a separate stream of, for example, an audio track or a commentary at the corresponding position and transmit the selected stream to the audio encoder.

In this way, by combining partial decoding according to the viewpoint and decoding of the audio stream, the track or the commentary according to the position, an ultra-realistic media service in which the user may be completely immersed can be provided.

While it is illustrated in FIGS. 4 and 6 to 8 that the respective processes are sequentially executed, embodiments are not limited thereto. In other words, the processes illustrated in FIGS. 4 and 6 to 8 may be executed in different order or executed in parallel. Accordingly, embodiments are not limited to the sequential order of FIGS. 4 and 6 to 8.

The video decoding method according to the embodiment illustrated in FIGS. 4 and 6 to 8 may be implemented by a computer program and recorded on a computer-readable recording medium. The computer-readable recording medium on which the program for implementing the video decoding method according to the embodiment is recorded includes all types of devices in which data readable by a computer system is stored.

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand that the scope of the embodiments is not limited by the explicitly described above embodiments but is inclusive of the claims and equivalents thereof.

What is claimed is:

1. An apparatus of processing a first bitstream in which each of pictures has been encoded with being split into a plurality of tiles, each tile comprised of one or more coding tree units, the first bitstream including encoded pixel data of the pictures and parameters used for encoding the pictures, the apparatus comprising one or more processors configured to:
receive the first bitstream which includes tile split information and area information,
wherein the area information is included in a header of the first bitstream, the header being a Sequence Parameter Set containing parameters which are referenced in common by all of the pictures, and
wherein the area information comprises first and second syntax elements for respectively indicating horizontal and vertical coordinates of a reference position in the pictures, and third and fourth syntax elements for respectively indicating a width and a height from the reference position, and allows an area which includes two or more tiles;
generate a second bitstream to be decoded, by:
extracting, from the encoded pixel data of the pictures included in the first bitstream, only encoded pixel data of an area extending by the width and the height indicated by the third and fourth syntax elements from the reference position indicated by the first and second syntax elements, and
modifying at least part of the parameters in the first bitstream using the reference position, and the width and the height from the reference position which are defined by the area information; and
output the second bitstream to thereby decode the extracted encoded pixel data.

2. The apparatus of claim 1, wherein the area information included in the first bitstream is a null or default value set in a predetermined field of the first bitstream received from a video encoding apparatus; and
 wherein at least part of the parameters in the first bitstream are modified by resetting the null or default value set in the predetermined field of the first bitstream.

3. The apparatus of claim 1, wherein the second bitstream is generated by performing a process comprising:
 decoding a flag indicating whether to perform partial decoding from the header of the first bitstream; and
 when the flag indicates partial decoding, decoding the area information from the header of the first bitstream and generating the second bitstream which is comprised of only encoded pixel data corresponding to the area defined by the area information.

4. The apparatus of claim 1, wherein the area information further includes information for indicating an additional area expanded from the area,
 wherein the additional area is defined as a proportion to a size of the area or an absolute size.

5. A non-transitory recording medium storing a second bitstream generated by a method of processing a first bitstream in which each of pictures has been encoded with being split into a plurality of tiles, each tile comprised of one or more coding tree units, the first bitstream including encoded pixel data of the pictures and parameters used for encoding the pictures, the method comprising:
 receiving the first bitstream which includes tile split information, and area information for specifying a rectangular area which includes at least one tile defined by the tile split information,
  wherein the area information is included in a header of the first bitstream, the header being a Sequence Parameter Set containing parameters which are referenced in common by all of the pictures, and
  wherein the area information comprises first and second syntax elements for respectively indicating horizontal and vertical coordinates of a reference position in the pictures, and third and fourth syntax elements for respectively indicating a width and a height from the reference position, and allows an area which includes two or more tiles; and
 generating a second bitstream to be decoded, by:
  extracting, from the encoded pixel data of the pictures included in the first bitstream, only encoded pixel data of an area extending by the width and the height indicated by the third and fourth syntax elements from the reference position indicated by the first and second syntax elements, and
  modifying at least part of the parameters in the first bitstream using the reference position, and the width and the height from the reference position which are defined by the area information.

\* \* \* \* \*